UNITED STATES PATENT OFFICE.

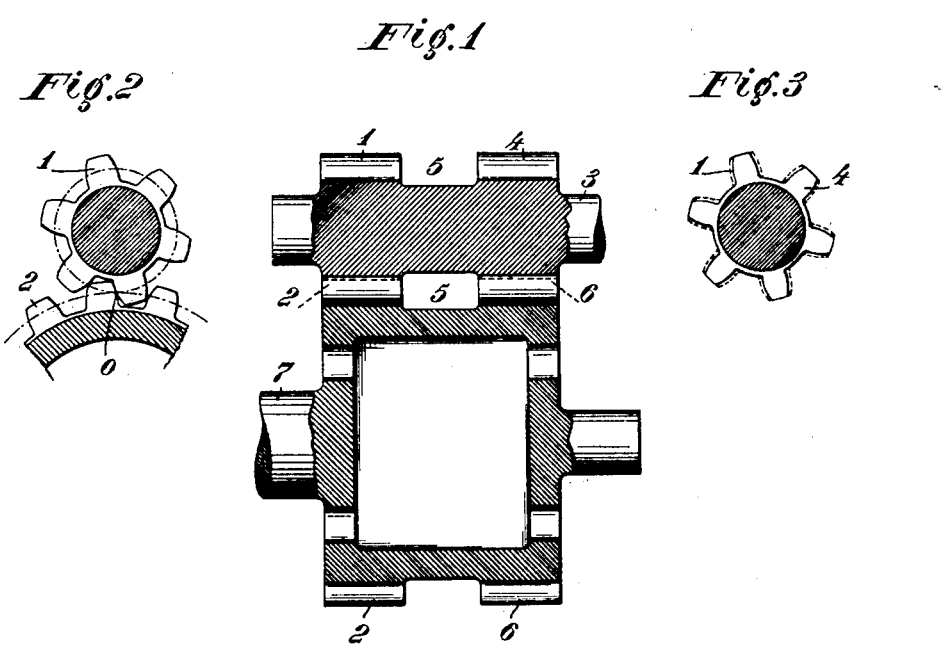

MAX MAAG, OF ZURICH, SWITZERLAND.

TOOTHED GEARING.

1,396,338.  Specification of Letters Patent.  Patented Nov. 8, 1921.

Application filed April 14, 1920. Serial No. 373,940.

*To all whom it may concern:*

Be it known that I, MAX MAAG, a citizen of the Republic of Switzerland, residing at Zurich, Hardstrasse 219, Switzerland, have invented certain new and useful Improvements in Toothed Gearings Consisting of a Number of Partial Toothed Rims with Different Thickness of Tooth; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to toothed gearing with a number of rims the teeth of which vary in thickness.

In toothed gearings for transmission of large outputs particularly in reducing gears for turbines having great width of tooth and small diameter of pinions, the pinions are subjected to great deformations caused by the torsional stresses, so that the pressure at pitch-line is very unequally divided over the width of the teeth, it is a maximum on the side adjacent to the driving engine and decreases toward the other side to an amount not far of zero.

The object of the present invention is to give a further solution of the problem of equalizing the pressure at pitch-line over the whole width of teeth with toothed wheels, the toothed rims of which are subdivided in an axial direction into a number of partial rims. The torsion is taken into consideration by dimensioning the thickness of tooth and the space of tooth respectively of at least one of the co-acting toothed wheels so as to correspond to the amount of torsion of the partial rims against each other. In order to get a theoretically equally distributed pressure on the teeth over their whole undivided width, the thickness of such teeth would have to decrease progressively from one end of the teeth to the other in accordance with the varying theoretical torsional deformation between every two subsequent sections of the gear. Cutting teeth of such shape would involve many difficulties, to avoid this the rim is subdivided in axial direction into two or more partial rims and the thickness of teeth of each rim is dimensioned in the manner above described to correspond to the average torsion of two adjacent partial rims whereby an average equalization of pressure over the width of every partial rim is attained.

The invention will now be explained with reference to the accompanying drawing, Figure 3 of which representing by way of example a pinion according to the invention.

In this drawing:

Fig. 1 is a section in axial direction through a known gearing, which is subdivided into two partial gearings.

Fig. 2 is a radial section through the pinion and the driven wheel.

Fig. 3 is a radial section through a pinion showing the mode of carrying out this invention.

A driving shaft 3 transmits energy to the two partial rims 1 and 4 of a pinion, which are in mesh with the partial rims 2 and 6 of a driven wheel and through the latter wheel the energy is transmitted to a driven shaft 7. The turning moment of the driving shaft produces a pressure $P_1$ in the teeth of partial gearing 4, 6 and a pressure $P_2$ in partial gearing 1, 2, which forces act at the points of contact of the pitch-circles of the partial gearings (*i. e.* at point *o* of Fig. 2). The magnitude of the torsional displacement of the two partial rims of the pinion against each other may be designated with *a* and measured as the length of an arc of the pitch circle. The corresponding torsional displacement of the two partial rims of the driven wheel will be *b* measured again as the length of an arc of the pitch circle. In all practical cases the polar moment of resistance of the part of the rim from center to center of the partial rims of the pinion on which the torsion depends is very much smaller than the polar moment of resistance of the corresponding part of the rim of the driven wheel. In consequence thereof, the torsion *a* is very much greater than *b*. The pressures $P_1$ and $P_2$ can be made to be equal when the flanks of the teeth of the partial rims of one of the wheels, for instance of the two pinion rims are displaced against each other by an amount corresponding to the difference of the torsions, *i. e.* by $a-b$.

As shown in the drawings the height of the teeth in each partial rim of the gears is uniform, the thickness only of the teeth in the separate rims being altered in accordance with the deflection or torsional displacement of the driving pinion.

To this end the teeth of partial rim 4 of the pinion may be thinned by that amount of the relative torsion.

An exemplification of a pinion according to this invention is shown in Fig. 3, wherein the smaller teeth shown in full lines are intended for the partial rim 4 adjacent to the drive and thicker teeth shown in dotted lines are the teeth of the partial rim 1 on the remote side.

I claim:

1. A toothed gearing, comprising a driving wheel the toothed rim of which is provided with teeth of uniform height and is subdivided in axial direction into a number of partial rims, a driven wheel consisting of a similar number of partial rims coacting with the former, the partial rims being provided with teeth the thickness of which varies from rim to rim in accordance with the torsional displacements of the rims against each other caused by the transmitted power.

2. A toothed gearing, comprising a driving wheel the toothed rim of which is provided with teeth of uniform height and is subdivided in axial direction into a number of partial rims, a driven wheel consisting of a similar number of partial rims co-acting with the former, the teeth of the partial rims of one wheel being of different thickness, the rim adjacent to the driving engine being provided with thinner teeth than the remote rim, to take into account the torsional displacement of the rims against each other.

3. A toothed gearing, comprising a driving wheel the toothed rim of which is provided with teeth of uniform height and is subdivided in axial direction into a number of partial rims, a driven wheel consisting of a similar number of partial rims co-acting with the former, the partial rims of the driving wheel being provided with teeth the thickness of which decreases from rim to rim from the remote rim to the rim nearest to the driving engine while the spaces of tooth in all the partial rims of the driven wheel are uniform, whereby a progressive clearance between the flanks of teeth of the co-acting partial gearings is produced which corresponds to the progressive torsional displacement of the rims against each other.

In testimony that I claim the foregoing as my invention, I have signed my name.

MAX MAAG.